United States Patent
Lundgaard et al.

(10) Patent No.: US 11,361,362 B2
(45) Date of Patent: Jun. 14, 2022

(54) METHOD AND SYSTEM UTILIZING ONTOLOGICAL MACHINE LEARNING FOR LABELING PRODUCTS IN AN ELECTRONIC PRODUCT CATALOG

(71) Applicant: salesforce.com, inc., San Francisco, CA (US)

(72) Inventors: Keld Lundgaard, Cambridge, MA (US); Cameron Wolfe, Austin, TX (US)

(73) Assignee: Salesforce, Inc., San Francisco, CA (US)

( * ) Notice: Subject to any disclaimer, the term of this patent is extended or adjusted under 35 U.S.C. 154(b) by 27 days.

(21) Appl. No.: 16/707,441

(22) Filed: Dec. 9, 2019

(65) Prior Publication Data

US 2021/0049664 A1 Feb. 18, 2021

Related U.S. Application Data

(60) Provisional application No. 62/887,744, filed on Aug. 16, 2019.

(51) Int. Cl.
 *G06Q 30/06* (2012.01)
 *G06F 16/903* (2019.01)

(52) U.S. Cl.
 CPC ... *G06Q 30/0629* (2013.01); *G06F 16/90344* (2019.01); *G06F 16/90348* (2019.01);
 (Continued)

(58) Field of Classification Search
 CPC . G06Q 30/0601–0645; G06Q 30/0603; G06Q 30/0627; G06F 16/35; G06F 16/90344; G06F 16/90348; G06F 16/36
 (Continued)

(56) References Cited

U.S. PATENT DOCUMENTS 8,165,414 B1 * 4/2012 Yagnik ............... G06F 16/41
 382/255
8,781,916 B1 * 7/2014 Buryak ............ G06Q 30/0631
 705/26.7
(Continued)

OTHER PUBLICATIONS

Walli, Betty. "Taxonomy 101: The Basics and Getting Started with Taxonomies" Apr. 15, 2014. kmworld.com (Year: 2014).*
(Continued)

*Primary Examiner* — Allison G Wood
*Assistant Examiner* — Katherine A Barlow
(74) *Attorney, Agent, or Firm* — Butzel Long (57) ABSTRACT

Systems and methods are provided for receiving, at a server, a selection of an anchor product from an electronic catalog stored in at least one storage device communicatively coupled to the server, and vectorizing at least one of text and images associated with the selected anchor product and other products in the catalog. At least one of key words may be determined from text data and key images from image data for each product of the catalog. Vectors may be formed from at least one of the keywords and key images, and concatenating the separate vectors together to form final vectors for the products. A similarity search may be performed using the final vectors to determine a group of similar products from the vectorized products of the catalog. Selected products that are within a same slot as the anchor product may be labelled in batch.

12 Claims, 5 Drawing Sheets

(52) U.S. Cl.
CPC ..... *G06Q 30/0603* (2013.01); *G06Q 30/0621* (2013.01); *G06Q 30/0627* (2013.01); *G06Q 30/0641* (2013.01)

(58) Field of Classification Search
USPC ................................ 705/26.1–27.2; 707/769
See application file for complete search history.

(56) References Cited

U.S. PATENT DOCUMENTS

| | | | |
|---|---|---|---|
| 11,100,560 B2* | 8/2021 | Parker | G06N 20/00 |
| 2010/0082697 A1* | 4/2010 | Gupta | G06F 16/35 |
| | | | 707/802 |
| 2015/0170040 A1* | 6/2015 | Berdugo | G06N 5/04 |
| | | | 706/11 |
| 2016/0078507 A1* | 3/2016 | Shivaswamy | G06Q 30/0605 |
| | | | 705/26.2 |
| 2018/0144269 A1* | 5/2018 | Wilson | G06N 5/022 |
| 2019/0164062 A1* | 5/2019 | Moura | G06F 16/90344 |

OTHER PUBLICATIONS

Bell, S. et al. "Learning Visual Similarity for Product Design with Convolutional Neural Networks." (Aug. 2015). ACM Trans. 10 pages. (Year: 2015).*

Zahavy, Tom et. al. "Is a Picture Worth a Thousand Words? A Deep Multi-Modal Architecture for Product Classification in E-Commerce" The Thirtieth AAAI Conference on Innovative Applications of Artificial Intelligence, Feb. 2-7. (Year: 2018).*

Pandey S., et al. "Data Classification Using Machine Learning Approach." Intelligent Systems Technologies and Applications. ISTA 2017. Advances in Intelligent Systems and Computing, vol. 683. Springer, Cham. https://doi.org/10.1007/978-3-319-68385-0_10 (Year: 2018).*

* cited by examiner

METHOD AND SYSTEM UTILIZING ONTOLOGICAL MACHINE LEARNING FOR LABELING PRODUCTS IN AN ELECTRONIC PRODUCT CATALOG

CROSS-REFERENCE TO RELATED APPLICATIONS

This application claims priority to U.S. application Ser. No. 62/887,744, filed Aug. 16, 2019, the disclosure of which is incorporated by reference in its entirety.

BACKGROUND

Present systems have customers manually label products in digital catalogs. These customers typically use the labeled product catalogs to assist potential purchasers locate particular products of interest via a search query, or by making selections from provided lists (e.g., product type, color, size, or the like). The terms of the search query or the selections from the list are used to find products that have labels that match the terms of the query or the selections.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide systems and methods to create a machine learning model for product ontology. Implementations of the disclosed subject matter may also provide systems and methods for customers to label data for the machine learning model, and for the model to learn substitute product categories.

Implementations of the disclosed subject matter may train the machine learning model to classify products and/or label products for an electronic catalog. Implementations of the disclosed subject matter may use the machine learning model to form groups of similar products, label a plurality of the similar products at once, and/or dynamically add new classes of products into the system. Implementations of the disclosed subject matter may dynamically retrain the machine learning model as data is being labeled. That is, labeling data using the machine learning model may become easier as the model improves, and the model may be used to label groups of products quickly.

The systems and methods of the disclosed subject matter may be used for product recommendations. In particular, the machine learning systems and methods may be used recommending similar products to a selected product, and/or for Complete the Set (CTS) product recommendations, where complementary products may be recommended (e.g., one or more shirts may be recommended for a selected pair of pants, or a belt may be recommended for the selected pair of pants).

In order for typical machine learning models to perform at the highest possible accuracy, each customer may label a portion of their product catalog, which can be time consuming. Implementations of the disclosed subject matter provide a data labeling system for product ontology which uses machine learning to quicken the process for labeling data, such as products in an electronic catalog. A user and/or customer may label data quickly and intuitively to improve the product recommendations and/or CTS recommendations provided (e.g., by a website). As the customer labels data, the machine learning model may be dynamically retrained. By retraining the model, the performance of the data labeling system is improved, as the system uses the machine learning model to label large batches of similar products.

The systems and methods disclosed herein may allow for the machine learning model to learn labeling of a product catalog in less time than current systems. This may provide for an increased number of products to be labeled within a predetermined period of time. That is, implementations of the disclosed subject matter may reduce the time, complexity, and computing resources for data on-boarding and/or labeling processes. The increased number of products accurately labeled may improve the performance for product and/or CTS recommendations.

Figure 1:
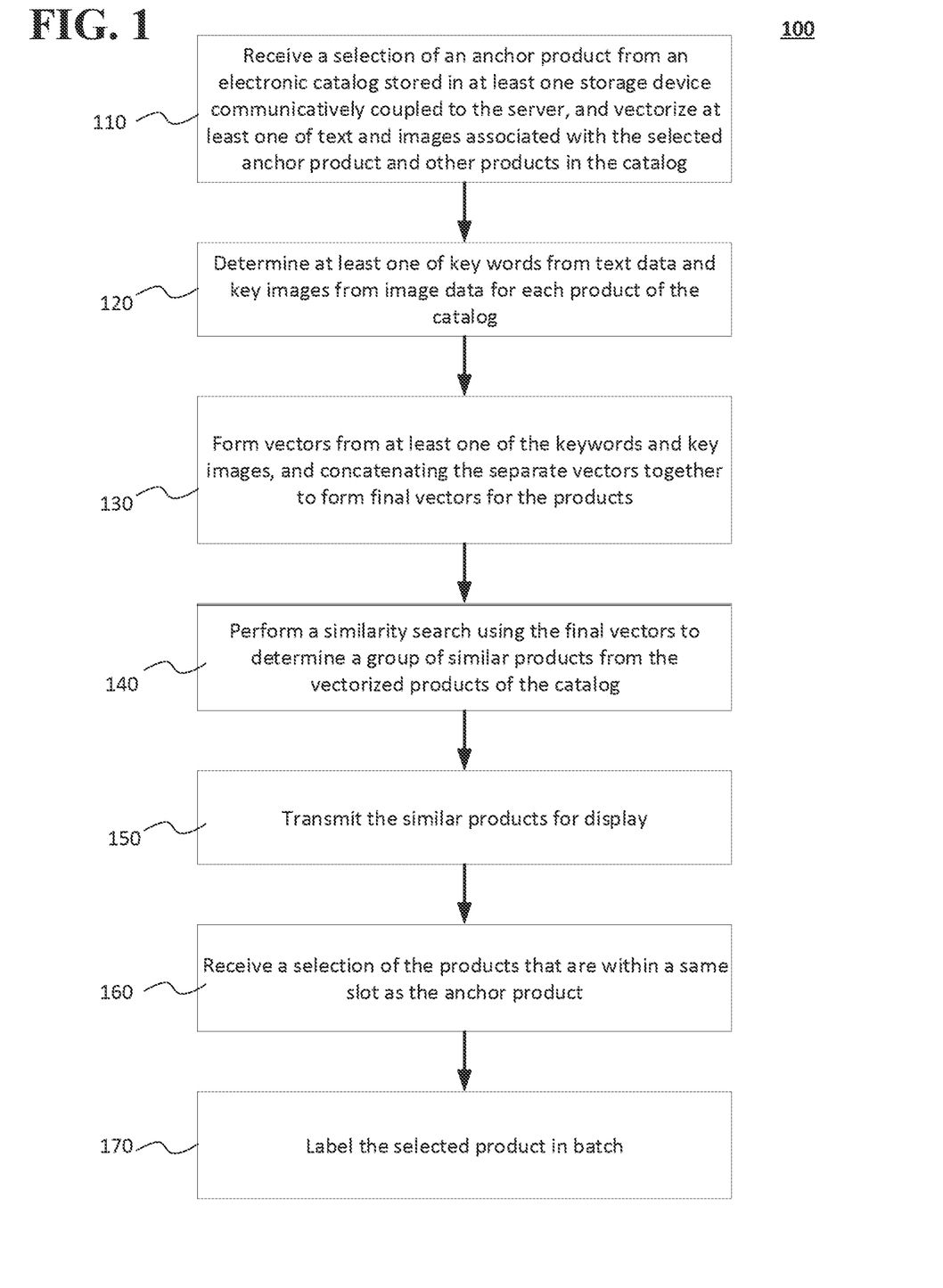
FIGS. 1-3 show example methods of labeling data according to implementations of the disclosed subject matter.

FIG. 1 shows a first method (e.g., method 100) of labeling data according to an implementation of the disclosed subject matter. The method 100 may be used when there are no known slot labels and/or there is no machine learning model trained to make any slot assignments. Method 100 may be used find similar products to a randomly selected product, and label the similar products in batch when there has been no previous labeling of products and/or the machine learning model has not been trained.

A slot label may be a label for a particular product and/or group of products, where different products may have different slot labels. Slot assignments may be made (e.g., by computer 500, central component 600 and/or second computer 700 shown in FIG. 4) where a product is assigned a slot label. The slot labels and/or slot assignments may be stored, for example, in storage 710 of second computer 700 shown in FIG. 4 and/or in database systems 1200*a-d* shown in FIG. 5. Slot labels may be useful for CTS product recommendation systems, where it is desirable to recommend related and non-overlapping products. For example, if an initial product selected is a dress, the CTS product recommendation system does not want to recommend an overlapping product, such as a shirt. In this example, the CTS recommendation system may use the slot labeling to select another product to recommend to complement the dress, such as a pair of shoes.

Figure 4:
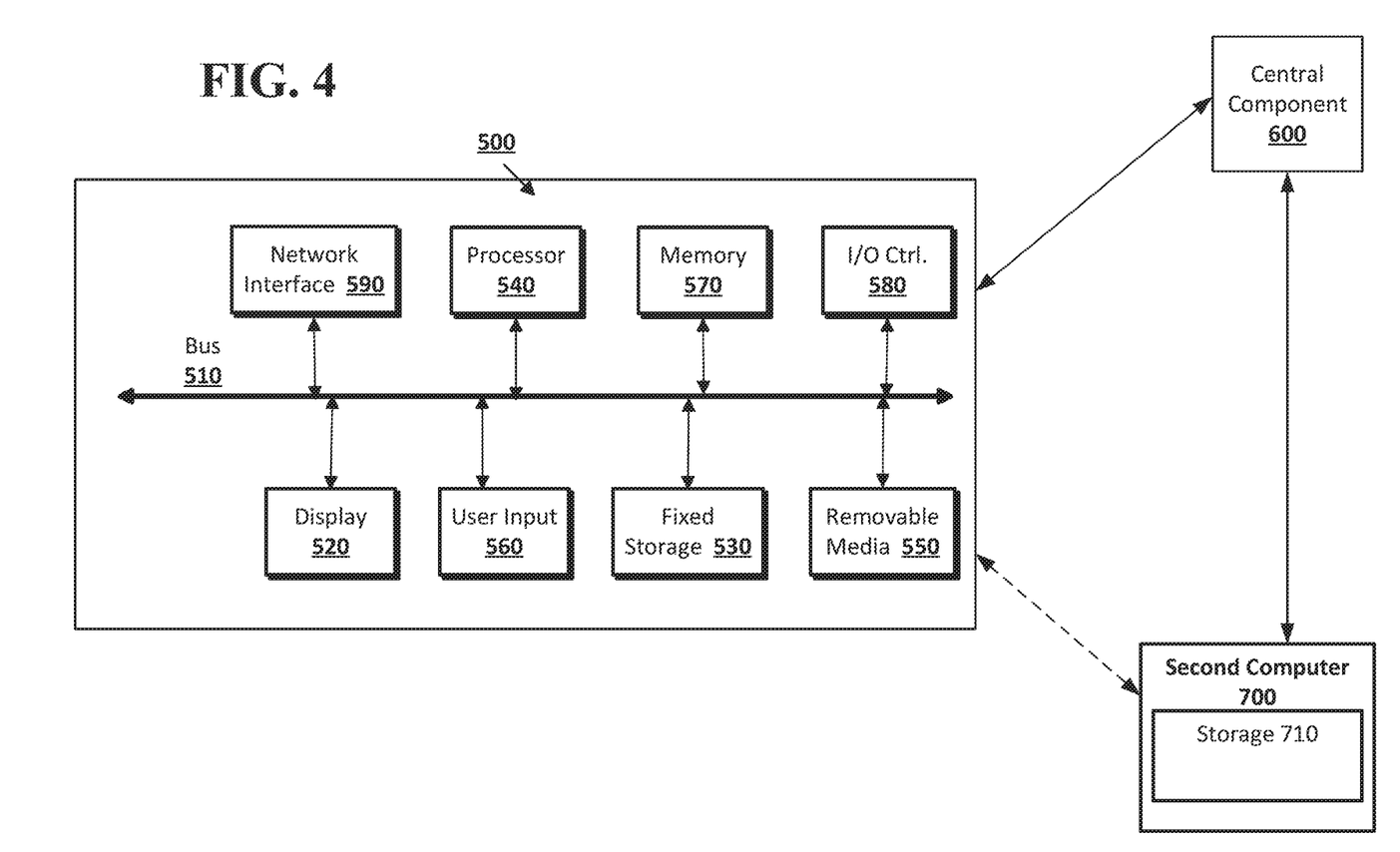
FIG. 4 shows a computer system according to an implementation of the disclosed subject matter.

At operation 110, a server (e.g., central component 600 and/or second computer 700 shown in FIG. 4) may receive a selection of an anchor product from an electronic catalog stored in at least one storage device communicatively coupled to the server, and may vectorize at least one of text and images associated with the selected anchor product and other products in the catalog. The selected anchor product may be a random selection or any other type of selection of a product from a catalog (e.g., a customer catalog or the like).

Figure 5:
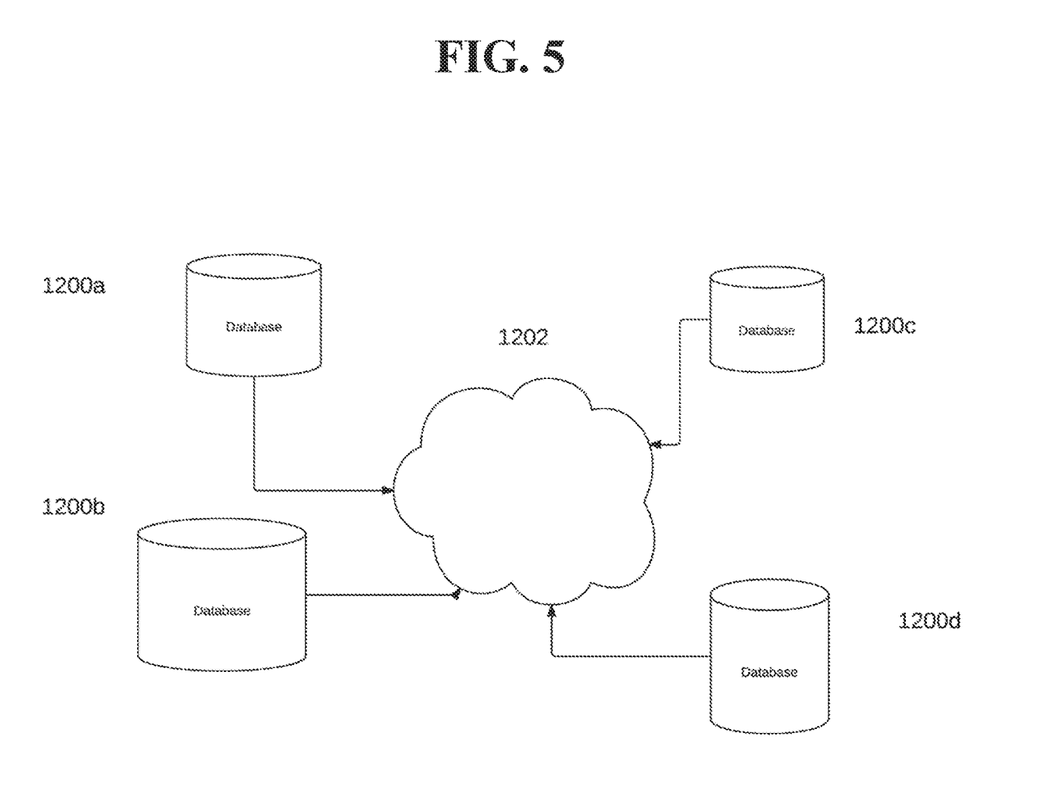
FIG. 5 shows a network configuration according to an implementation of the disclosed subject matter.

In some implementations, the server may receive a selection of the anchor product from a labeling interface (e.g., computer 500 shown in FIG. 5). The products, product data (e.g., text data, image data, and the like), and/or product catalog may be stored, for example, in storage 710 of second computer 700 shown in FIG. 4 and/or in database systems 1200a-d shown in FIG. 5.

In some implementations, the server may vectorize (i.e., form vectors from) the at least one of text and images associated with the selected anchor product and other products in the catalog using term frequency-inverse document frequency (TFIDF). In some implementations, the server may vectorize columns of the at least one of text and images associated with the selected anchor product and other products in the catalog by product name, product type, product description, and/or category name list. The server may concatenate the vectorized columns together to form final vectors of the anchor product and other products.

At operation 120, the server may determine at least one of key words from text data and key images from image data for each product of the catalog. For example, operation 120 may use the TFIDF vectorized text (e.g., from operation 110) associated with the anchor product and/or other product in the catalog. This text vectorization may fit the TFIDF model separately to columns of text data being used for each product. For example, there may be separate columns for product name, product type, product description, category name lists, and the like. That is, the TFIDF may be used to reflect how important a word is in a catalog. A TFIDF value may increase proportionally to the number of times a word appears in the catalog, and TFIDF may be used to determine the keywords. In some implementations, image data may be used instead of, or in addition to, text in vectorizing products in the catalog, and key images may be determined for each product.

At operation 130, the server may form vectors from at least one of the keywords and key images, and may concatenate the separate vectors together to form final vectors for the products. For example, when each of the separate TFIDF models are created (e.g., for each column of text data for each product), each text column for a product may be transformed separately (e.g., central component 600 and/or second computer 700 shown in FIG. 4) into a vector. TFIDF is merely an example method to determine keywords and/or key images, and to form vectors, and any other suitable method may be used to determine keywords, key images, and form vectors. The separate vectors (e.g., for each column of text for a product and/or images of a product) may concatenated together to form the final vector for the product.

At operation 140, the server may perform a similarity search using the final vectors to determine a group of similar products from the vectorized products of the catalog. For example, a Non-Metric Space Library (NMSLIB) similar search or other suitable similarity search may be performed (e.g., by computer 500, central component 600 and/or second computer 700 shown in FIG. 4) to select a group of similar products from the catalog using the final text vector for the product. That is, products may compared based on their respective vectors, with similar products having similar vectors.

At operation 150, the server may transmit, via a communication network coupled to the server, the similar products for display (e.g., on display 520 of computer 500 shown in FIG. 5). At operation 160, the server may receive a selection of the products that are within a same slot as the anchor product, and the server may label at the selected products in batch at operation 170.

For example, when one or more of the positive slot examples are selected, these products may be labeled in batch, and a unique slot index may assigned to this group (e.g., by a user and/or by central component 600 and/or second computer 700 shown in FIG. 4). The slot index may include a plurality of character (e.g., numbers, letters, words, symbols, or the like) which may be for the batch of similar products. When one or more slots have been created, a group of products may be assigned to a slot that is already in existence. Method 100 shown in FIG. 1, which includes selecting a product and labeling in batch, may be repeated until sufficient data has been labeled to train the machine learning model that may be used by the labeling interface. The amount of data to train the machine earning model may be based, for example, on the size of the product catalog, the number of products, and the range of differences between the products, or the like.

Figure 2:
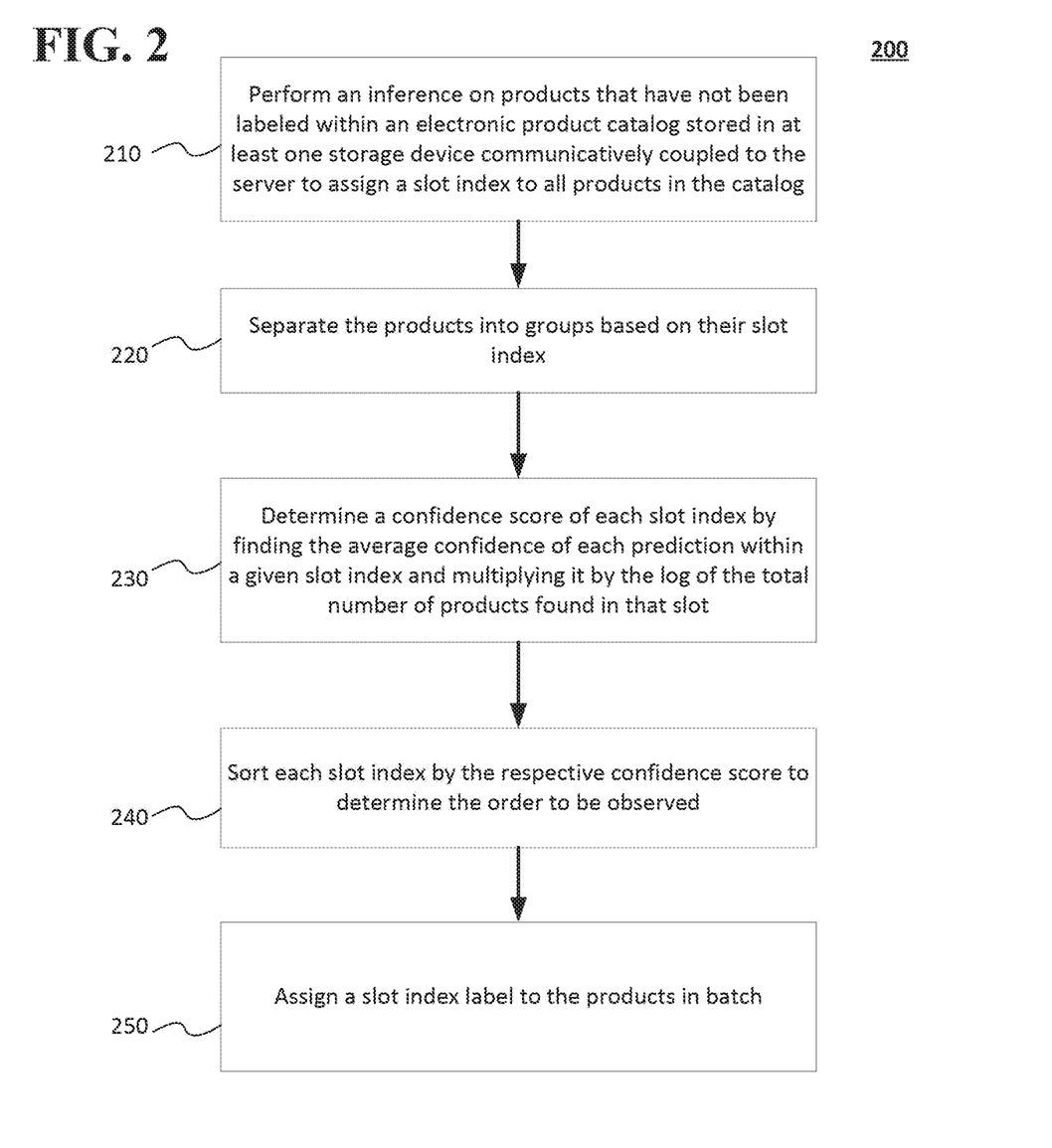

FIG. 2 shows a second example method 200 of labeling data according to an implementation of the disclosed subject matter. The method 200 may utilize the machine learning model training to assign slots to products. This may increase the speed of the data labeling process, and the number of products that may be labeled.

Method 200 may be used when the machine learning model is trained on a first catalog of products, and the trained machine learning model is to be used to label products in a second catalog. The results of the labeling may be observed to determine the performance of the machine learning model, such as which products the machine learning model is accurately labeling, and determine where the machine learning model is performing less accurately with labeling. In some implementations, some spot labeling of products may be performed during the initial performance check of the machine learning model, such as on products that the model is labeling less accurately.

In operation 210, the server may perform an inference on products that have not been labeled within an electronic product catalog stored in at least one storage device (e.g., in storage 710 of second computer 700 shown in FIG. 4 and/or in database systems 1200a-d shown in FIG. 5) communicatively coupled to the server to assign a slot index to all products in the catalog. Inference may be used to determine which slot index an unlabeled product may belong to. Once the machine learning model inference is used to assign a slot index to products within the catalog, the products may be separated into groups based on their slot index at operation 220.

At operation 230, the server may determine a confidence score of each slot index by finding the average confidence of each prediction within a given slot index and multiplying it by the log of the total number of products found in that slot. The confidence values may range, for example, between 0 and 1 as to whether the product may be of a particular slot. The confidence of the slot prediction may be determined, for example, by a maximum softmax score in the output layer of the prediction for the product. With softmax, the range of values may be between 0 and 1, and the sum of all probabilities may be equal to one. Softmax is merely an example to generate and normalize the confidence score, and other normalizing methods may be used. Alternatively, no normalizing may be used.

For example, in some implementations, the confidence score may be determined to be between 0 and 1, but no sum of probabilities may be determined, so that the server may use the confidence score to determine which products are not known, or have confidence values less than or equal to a predetermined value. In this implementation, when the confidence score is between 0 and 1, and the score is greater than or equal to a predetermined value, the system may determine whether the machine learning model is operating in a desired manner. This may determine, for example, whether there is a problem with the ontology of the products in the machine learning model. For example, high confidence scores for a product that has been assigned the wrong slot may be identified. In another example, a problem may be identified when there is a high confidence value on two different slots. The server may use calculate the probabilities distribution (e.g., with the softmax function). Slots with at least a predetermined number of confident product predictions may be given high confidence scores.

At operation 240, the server may sort each slot index by the respective confidence score to determine the order to be observed. For example, the different slots may be sorted in descending order by confidence score to determine the order in which they should be displayed (e.g., on display 520 of computer 500 shown in FIG. 4). For each slot, products predicted may be displayed, and the user may select the positive examples for a given slot (e.g., via the user input 560 of computer 500 shown in FIG. 4). By ordering the predictions, a user and/or customer may check the accuracy of the assignment of slots for those which have the highest confidence values. If it is determined that the accuracy of the predictions is below a predetermined threshold value, method 300 shown in FIG. 3 and described below may be used. As method 200 may comparatively have reduced efficacy at labeling examples for new slots and/or labeling products that the machine learning model has never seen, method 300 may be used to label such products.

At operation 250, the slot index label may be assigned to the products in batch by the server so that a plurality of products can be labeled at once. Method 200 of labeling data may label large numbers of products that have been learned by the machine learning model.

Figure 3:
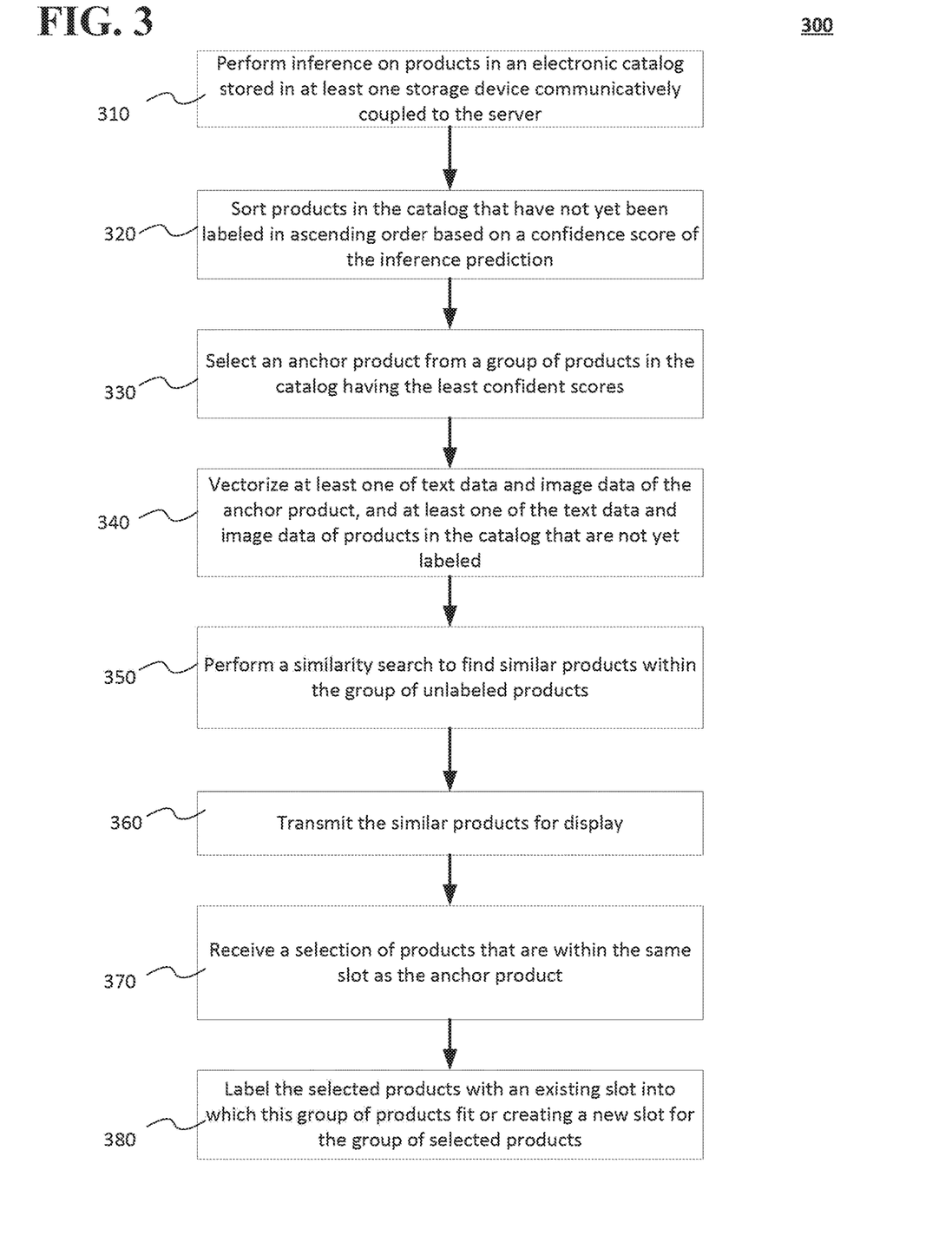

Method 300 shown in FIG. 3 may be used to quickly label new and unknown products or slots. Method 300 is similar to method 100 shown in FIG. 1 and described above, but method 300 may have some known slot labels and/or machine learning model training to make slot assignments. At operation 310, the server (e.g., by central component 600 and/or second computer 700 shown in FIG. 4) may perform inference on products in an electronic catalog stored in at least one storage device (e.g., storage 710 of second computer 700 shown in FIG. 4 and/or in database systems 1200a-d shown in FIG. 5) communicatively coupled to the server. In some implementations, the inference may be performed on products in the catalog using the machine learning model.

At operation 320, the server may sort the products in the catalog that have not yet been labeled in ascending order based on a confidence score of the inference prediction. For example, when inference is complete, the products that have not yet been labeled may be sorted in ascending order based on the confidence of the machine learning model's prediction at operation 320, and an anchor product may be selected from a group of the products having the lowest confidence scores as determined by the machine learning model at operation 330. Text data and/or image data of a selected anchor product, and the text data and/or image data of the products in the catalog that are not yet labeled, may be vectorized at operation 340 (e.g., using the methods described above (e.g., TFIDF)). A similarity search (e.g., NMSLIB) may be performed by the server at operation 350 to find similar products within the group of unlabeled products.

At operation 360, the server may transmit, via a communications network coupled to the server, the similar products for display. The similar products may be displayed to the user (e.g., via display 520 of computer 500 shown in FIG. 4), and the products that are within the same slot as the anchor product may be selected. That is, the server may receive a selection of products that are within the same slot as the anchor product at operation 370. At operation 380, the server may label the selected products with an existing slot into which this group of products fit or creating a new slot for the group of selected products.

In order to simplify the process of choosing a slot index, the machine learning model may be used to run inference on the positive product examples. The existing slots may be displayed to the user in descending order based on predictions of the machine learning model, such that slots that are commonly predicted for this group of products may be displayed first. If the model does not predict any slots confidently for the group of products, a new slot may be created for the product group. By repeating method 300, new or unknown product groups may be quickly found and labeled in batch so that the model can be retrained to recognize such products.

Methods 100, 200, and 300 shown in FIGS. 1-3 and described above may be used to label product catalogs into ontology slots more quickly than present systems and methods.

The underlying model for methods 100, 200, and/or 300 may be dynamically retrained as data is being labeled. When a new batch of data is labeled, it may be combined with existing data labels. This combined data may be used to retrain a model, when, for example, the user is labeling the next batch of data. When the training of the model is complete, the underlying model being used may be replaced with the newly trained model. If the training of the machine learning model becomes too slow (e.g., because a large model is being used or because there is too much data), the training of the machine learning model may be improved by retraining the final layer of the machine learning model for classification (i.e., retraining the layer that makes the classification). This may allow the training process to be made quicker, and may have minimal impact on the accuracy of the model. As a result of this dynamic model retraining, the data labeling process may improve as the accuracy of the model and categories of products that the model understands improve. As the user and/or customer labels data, the confidence of the model when predicting slot indices for products within the catalog, as well as the number of labels assigned, may be used to determine an overall percentage that describes how well the machine learning model understands the product catalog. That is, the user may see a quantitative description of how the understanding of the product catalog is improving (e.g., the accuracy of the labeling is improving) as data is being labeled.

Implementations of the presently disclosed subject matter may be implemented in and used with a variety of component and network architectures. FIG. 4 is an example computer 500 suitable for implementing implementations of the presently disclosed subject matter. As discussed in further detail herein, the computer 500 may be a single computer in a network of multiple computers. In some implementations, the computer 500 may be used to select a product as the anchor product, display the similar products, and/or receive a selection of the products that are within the same slot as the anchor product. As shown in FIG. 4, the computer 500 may communicate with a central or distributed component 600 (e.g., server, cloud server, database, cluster, application server, neural network system, or the like).

The central component 600 may communicate with one or more other computers such as the second computer 700, which may include a storage device 710. The second computer 700 may be a server, cloud server, neural network system, or the like. Central component 600 and/or the second computer 700 may fit TFIDF models, perform vectorization, perform similarity searches, assign slot indexes, and the like. The storage 710 may use any suitable combination of any suitable volatile and non-volatile physical storage mediums, including, for example, hard disk drives, solid state drives, optical media, flash memory, tape drives, registers, and random access memory, or the like, or any combination thereof. In some implementations, the storage 710 may store the catalog information, product data, machine learning model data, label data, and the like.

Further, if the systems shown in FIGS. 4-5 are multitenant systems, the storage can be organized into separate log structured merge trees for each instance of a database for a tenant. Different tenant may store different product catalog data, product data, label data, and the like. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The information obtained to and/or from a central component 600 can be isolated for each computer such that computer 500 cannot share information with computer 400 (e.g., for security and/or testing purposes). Alternatively, or in addition, computer 500 can communicate directly with the second computer 700.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, as shown in FIGS. 4-5.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIGS. 4-5 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

FIG. 5 shows an example network arrangement according to an implementation of the disclosed subject matter. Four separate database systems 1200a-d at different nodes in the network represented by cloud 1202 communicate with each other through networking links 1204 and with users (not shown). The database systems 1200a-d may, for example, store catalog information, product data, machine learning model data, label data, and the like. In some implementations, the one or more of the database systems 1200a-d may be located in different geographic locations. Each of database systems 1200 can be operable to host multiple instances of a database, where each instance is accessible only to users associated with a particular tenant. Each of the database systems can constitute a cluster of computers along with a storage area network (not shown), load balancers and backup servers along with firewalls, other security systems, and authentication systems. Some of the instances at any of database systems 1200a-d may be live or production instances processing and committing transactions received from users and/or developers, and/or from computing elements (not shown) for receiving and providing data for storage in the instances.

One or more of the database systems 1200a-d may include at least one storage device, such as in FIG. 4. For example, the storage can include memory 570, fixed storage 530, removable media 550, and/or a storage device included with the central component 600 and/or the second computer 700. The tenant can have tenant data stored in an immutable storage of the at least one storage device associated with a tenant identifier. The tenant data may include, for example, catalog information, product data, machine learning model data, label data, and the like.

In some implementations, the one or more servers shown in FIGS. 4-5 can store the data in the immutable storage of the at least one storage device (e.g., a storage device associated with central component 600, the second computer 700, and/or the database systems 1200a-1200d) using a log-structured merge tree data structure.

The systems and methods of the disclosed subject matter can be for single tenancy and/or multitenancy systems. Multitenancy systems can allow various tenants, which can be, for example, developers, users, groups of users, and/or organizations, to access their own records (e.g., tenant data, replication configuration profiles, and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multitenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "transforming," "performing," "displaying," "determining," "sorting," "assigning," "vectorizing," "searching" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
receiving, at a server, a selection of an anchor product from an electronic catalog stored in at least one storage device communicatively coupled to the server, and vectorizing at least one of text and images associated with the selected anchor product and other products in the catalog, wherein the selected anchor product and the other products in the catalog are without slot labels, and wherein the slot labels are used to label one or more products, with different products having different slot labels, and wherein a machine learning model at the server is untrained in labeling the one or more products with the slot labels;
determining, at the server, at least one selected from the group consisting of: key words from the text, and key images from the images for each product of the catalog;
forming, at the server, vectors from at least one selected from the group consisting of: the key words, and key images;
concatenating, at the server, the separate vectors together to form final vectors for the products;
performing, at the server, a similarity search using the final vectors to determine a group of similar products from the vectorized products of the catalog;
transmitting, via a communication network coupled to the server, the similar products for display;
receiving, at the server, a selection of the products that are within a same slot as the anchor product;
labelling, at the server, the selected products in batch, wherein the selection of the products and the anchor product within the same slot have the same slot label;
determining, at the server, whether a predetermined number of products required to train the machine learning model has been labelled, wherein the predetermined number of products is at least partially based on at least one selected from the group consisting of: a size of the product catalog, and a number of products;
in accordance with a determination that the predetermined number of products has been labelled, dynamically training, at the server, the machine learning model based on the labelled products by iteratively transmitting predictions by the machine learning model for slots of a product to be labelled;
receiving selections of products that are within the same slot as a product to be labelled; and
dynamically retraining, at the server, a classifier of the machine learning model that labels a next batch of products based on first labels of a first batch of products and existing labels for the products of the electronic catalog.

2. The method of claim 1, wherein the received selection of the anchor product comprises:
receiving, at the server, a randomly selected product from the electronic catalog.

3. The method of claim 1, wherein the vectorizing comprises:
vectorizing the at least one of text and images associated with the selected anchor product and other products in the catalog using term frequency-inverse document frequency (TFIDF).

4. The method of claim 1, wherein the vectorizing comprises:
vectorizing columns of the at least one of text and images associated with the selected anchor product and other products in the catalog by at least one selected from a group consisting of: product name, product type, product description, and category name list; and
concatenating the vectorized columns together to form final vectors of the anchor product and other products.

5. The method of claim 1, further comprising:
assigning a unique slot index to a group of the labeled products.

6. The method of claim 1, further comprising:
assigning one or more products to an existing slot.

7. A system comprising:
a server including a hardware processor and a memory, to:
receive a selection of an anchor product from an electronic catalog stored in at least one storage device communicatively coupled to the server, and vectorize at least one of text and images associated with the selected anchor product and other products in the catalog, wherein the selected anchor product and the other products in the catalog are without slot labels, and wherein the slot labels are used to label one or more products, with different products having different slot labels, and wherein a machine learning model at the server is untrained in labeling the one or more products with the slot labels;
determine at least one selected from the group consisting of: key words from the text, and key images from the images for each product of the catalog;
form vectors from at least one selected from the group consisting of: the key words and key images;
concatenate the separate vectors together to form final vectors for the products;
perform a similarity search using the final vectors to determine a group of similar products from the vectorized products of the catalog;
transmit, via a communication network coupled to the server, the similar products for display;
receive a selection of the products that are within a same slot as the anchor product;
label the selected products in batch, wherein the selection of the products and the anchor product within the same slot have the same slot label;
determine whether a predetermined number of products required to train the machine learning model has been labelled, wherein the predetermined number of products is at least partially based on at least one selected from the group consisting of: a size of the product catalog, and a number of products;
in accordance with a determination that the predetermined number of products has been labelled, dynamically train the machine learning model based on the labelled products by iteratively transmitting predictions by the machine learning model for slots of a product to be labelled;
receive selections of products that are within the same slot as a product to be labelled; and
dynamically retrain a classifier of the machine learning model that labels a next batch of products based on first labels of a first batch of products and existing labels for the products of the electronic catalog.

8. The system of claim 7, wherein the server receives a randomly selected product from the electronic catalog.

9. The system of claim 7, wherein the server vectorizes the at least one of text and images associated with the selected anchor product and other products in the catalog using term frequency-inverse document frequency (TFIDF).

10. The system of claim 7, wherein the server vectorizes columns of the at least one of text and images associated with the selected anchor product and other products in the catalog by at least one selected from a group consisting of: product name, product type, product description, and category name list, and
wherein the server concatenates the vectorized columns together to form final vectors of the anchor product and other products.

11. The system of claim 7, wherein the server assigns a unique slot index to a group of the labeled products.

12. The system of claim 7, wherein the server assigns one or more products to an existing slot.

* * * * *